United States Patent Office 2,982,771
Patented May 2, 1961

2,982,771

PURIFICATION OF HETEROCYCLIC ORGANIC NITROGEN COMPOUNDS

George R. Bond, Jr., Paulsboro, N.J., assignor to Houdry Process Corporation, Wilmington, Del., a corporation of Delaware No Drawing. Filed Aug. 8, 1957, Ser. No. 676,947

10 Claims. (Cl. 260—319)

This invention is concerned with the purification of heterocyclic organic nitrogen compounds and is more specifically directed to a novel process for the purification of indole, its homologues and related compounds.

A number of methods are available for the preparation of indole and related heterocyclic organic nitrogen compounds. Such methods include pyrogenic decomposition of certain naturally occurring nitrogenous compounds of suitable structure, including some albumins. Another source of indole is the coal tar fraction boiling in the range of about 240–260° C. Catalytic methods have included the use of dehydrogenation catalyst for the conversion of ortho ethyl aniline.

The various suggested source materials or reaction products containing sufficient quantities of indole and/or other related compounds to justify their extraction and recovery have associated therewith a variety of diluent or contaminating materials, such as poly indoles, ethyl aniline, tars, various degradation products or the like. The presence of such materials is evident in a variety of ways such as by objectionable color, lower melting point and/or undesirable or disagreeable odors. For certain uses, indole and the like are required to have a relatively high degree of purity in that the effect of more than small amounts of extraneous materials is undesirable or may make the whole composition unsuitable for physiological or other reasons.

The need for methods of purifying these organic compounds has led through investigation to the development of a variety of purification systems. Included in such purification systems are solvent extraction, selective washing agents, and recrystallization in or from a wide variety of solvents such as certain petroleum fractions or water, or water-methanol, or the like.

It has now been found that heterocyclic organic nitrogen compounds having a high degree of purity are obtained by a special recrystallization procedure having a high degree of specificity and efficiency. Likewise, it has been found that the recrystallization procedure is a highly desirable adjunct to certain washing procedures which in themselves may remove up to relatively large quantities of objectionable components present in the material containing the desired heterocyclic organic nitrogen compounds.

In accordance with this invention, a charge stock containing heterocyclic organic nitrogen compounds is treated to recover such compounds in a more pure state by the process which includes effecting substantially complete solution of such compounds in an aqeous solution of ammonia, present in the solution in concentrations in the range of 2 to 15% or more of $NH_3$ by weight, and where such solution is employed in a weight ratio to the organic nitrogen compound of 10 to 1000 to 1; and crystallizing purified heterocyclic organic nitrogen compounds from the clarified solution.

The new method of purification herein set forth is superior to any of the heretofore available methods in that while the older methods all give some degree of purification, the present method can give a clean, crystalline heterocyclic organic nitrogen compound of purity higher than any commercially available and free from foreign odors. The method may involve treating a full reaction product or, preferably, a material which has been subjected to a prior purification or concentration, such as by distillation or washing with selected hydrocarbon fractions.

A preferred form of operation contemplates the removal of oily impurities and the like from the crystallized solid product. The wash treatment, for instance, may involve successive washings with pentane using anywhere from 1 to 5 volumes of the hydrocarbon. The washed material is dissolved in the ammonium hydroxide solution, preferably at mildly elevated temperatures utilizing a closed system to keep to a minimum evaporative loss of the ammonia. Extraneous undissolved material may be separated from the ammonium solution, as by decantation or filtration. The clarified solution is then adjusted to conditions conducive to crystallization of the heterocyclic nitrogen-containing compounds which, after separation from the mother liquor, are found to have a surprising and high degree of purity.

It is not to be assumed from the simplicity and efficiency of this new and novel process that the purification is obtained in a routine manner utilizing routine reagents. Actually, the procedure herein disclosed is contrary to the usual and expected concepts of solubilities of organic heterocyclic nitrogen compounds in various aqueous solutions.

With water as the solvent, the solubility of indole increases with temperature from—

0.0 g. indole/100 ml. solution at 32° F.
0.05 g. indole/100 ml. solution at 40° F.
0.22 g. indole/100 ml. solution at 75° F.
0.54 g. indole/100 ml. solution at 140° F.

Thus a recrystallization process based on water and operated cyclically through the temperature range of 40–140° F. would produce approximately 0.5 g. of indole per 100 ml. of solution per cycle.

With an aqueous caustic solution one might expect a modestly lower solvency for indole due to the "salting out" effect. This is, in fact, observed:

0.0 g. indole dissolved/100 ml. of 4% NaOH solution at 35° F.
0.01 g. indole dissolved/100 ml. of 4% NaOH solution at 40° F.
0.11 g. indole dissolved/100 ml. of 4% NaOH solution at 75° F.
0.29 g. indole dissolved/100 ml. of 4% NaOH solution at 140° F.

Thus while an inorganic base such as caustic (NaOH) might be expected to have a more selective solvency for indole, a recrystallization process operating between 40 and 140° F. would produce only 0.28 g. of indole per 100 ml. of solution per cycle. The "work" done would be about ½ that with water.

However, quite surprisingly the basic solution using $NH_4OH$ as the base (aqueous ammonia) does not show a "salting out" effect on indole. In fact, its solvency for indole is greater than that of caustic (NaOH solution) or water:

0.0 g. indole/100 ml. 4% ammonia water solution at 32° F.
0.07 g. indole/100 ml. 4% ammonia water solution at 40° F.
0.31 g. indole/100 ml. 4% ammonia water solution at 75° F.
0.74 g. indole/100 ml. 4% ammonia water solution at 140° F.

Thus with 4% aqueous ammonia a recrystallization process operating between 40 and 140° F. would produce 0.67 g. of indole per 100 ml. of solution per cycle, or the three processes would produce recrystallized indole in the ratio of—
 1.0 for 4% aqueous caustic to
 1.8 for water to
 2.4 for 4% aqueous ammonia for the equivalent amount of energy expended.

With higher concentrations of ammonia water one might logically expect the "salting out" effect of the inorganic solute to reexert itself. However, here again, it is found that higher concentrations of ammonia water showed increasingly higher solvency for indole, indicating that a recrystallization process operating under modest pressure (to avoid $NH_3$ loss) with about 12 wt. percent $NH_3$ in solution would be notably more efficient than a 4% $NH_3$ solution, or water or caustic.

0.0 g. indole/100 ml. 12.5% $NH_3$ solution at 32° F.
 0.115 g. indole/100 ml. 12.5% $NH_3$ solution at 40° F.
 0.510 g. indole/100 ml. 12.5% $NH_3$ solution at 75° F.
 About 1.25 g. indole/100 ml. 12.5% $NH_3$ solution at 140° F.

Thus 1.135 g. indole would be produced per cycle and the process would be about 400%

$$\left[\frac{1.135}{.28} \times 100 = 405\% \right]$$

as efficient as a 4% caustic solution.

To further emphasize the unusual advantage of a recrystallization process using about 12 wt. percent ammonia in water solution, the temperature ranges through which competitive units would have to operate to accomplish the same work are as follows:

Table I

TEMPERATURE DIFFERENTIALS NECESSARY TO DEPOSIT 2 PARTS INDOLE PER 100 PARTS OF SOLUTION

|  | ° F. | Ratio |
|---|---|---|
| 4% aqueous NaOH | 72 | 4.0 |
| Water | 40 | 2.2 |
| 4% aqueous $NH_3$ | 30 | 1.7 |
| 12.5% aqueous $NH_3$ | 18 | 1.0 |

The 12% ammonia water system thus operates at about one fourth the energy required for the 4% caustic system.

This very sensitive solvency for indole permits an aqueous ammonia system to operate (1) as a solvent extraction process to remove (dissolve) indole selectively from its accompanying impurities and (2) as an efficient recrystallization process to recover clean indole crystals from solution.

In a typical operation specifically concerned with the purification of indole, approximately 10 parts of 12 weight percent aqueous ammonia solution is used to treat approximately 1 part of 80 to 90% purity indole crystals. The mixture is heated at about 140–150° F. achieving substantially complete solution of the crystalline indole. The solution is then clarified by filtration and cooled with stirring to recrystallize substantially only indole. The residual liquor remaining after the recrystallization step may be reused, with suitable adjustment of concentration and volume, for further recrystallization treatment of additional indole, or may be suitably processed to recover not only the ammonia value but possibly organic compounds present therein from the indole purification step.

In connection with the preparation of purified indole, the determination of purities of samples as herein reported is based on freezing point determinations. To establish a reasonably firm base for the suggested criterion, freezing point values over a relatively wide range were developed, using as starting material the best indole sample obtainable from the Bureau of Mines, USDA. This material had a freezing point of 51.42° C. with impurity estimated at 0.13 mol percent. On the assumption that the impurity is ortho ethyl aniline, the freezing points of the primary systems are shown below.

Table II

| Mol Percent Indole | Ethyl Aniline | Freezing Pt., T, °K. | T, ° C. |
|---|---|---|---|
| 100 | 0 | 324.5 | 52.5 |
| 98.84 | 1.16 | 322.5 | 50.5 |
| 96.88 | 3.12 | 320.5 | 48.5 |
| 93.62 | 6.38 | 318.0 | 46.0 |
| 89.25 | 10.75 | 312.0 | 40.0 |
| 85.69 | 14.31 | 306.0 | 34.0 |

The following examples demonstrate the effective nature of the procedure. It is to be understood that the examples are illustrative and not limiting to either process or product other than in conjunction with the general comprehensive scope of the disclosed invention.

EXAMPLE I

A sample containing indole, having a purity of 91.5% based on the freezing point, was crystallized as relatively small crystals and treated as follows. Approximately two parts of sample were washed with 1 part of pentane and 3 successive pentane washings using approximately 0.2 part each time. The washed crystals, having a purity of 95% indicated by a freezing point of 46.2° C., were again washed with approximately the same amount of pentane and by a freezing point of 47.6° C. showed a purity of 97.7%. 13 parts of these crystals were treated with 1000 parts of 11.7% aqueous ammonia solution at 140° F. in a closed system until solution of the crystals was substantially complete. The solution was decanted from undissolved residue, chilled to 50° F., filtered when crystallization was complete, and the crystals vacuum dried at room temperature. The crystals, approximately 55% of the 97.7% purity material, had a freezing point of 51.2° C. and an indicated purity of 99.8%.

EXAMPLE II

The filtrate from the last separation stage of Example I was employed in the treatment of 13 parts of the 97.7% purity material of Example I. Treatment was at 150° F. until solution was substantially complete. The solution was decanted and then chilled to 42° F. When crystallization was complete the solution was filtered off and the crystals were vacuum dried at room temperature. This crystallization, with a yield of about 61.6%, had a freezing point of 51.4° C. with an indicated purity of 99.9%. The somewhat higher yield is indicative that crystallization at temperature below 50° but above about 30° F. is preferable.

EXAMPLE III

The filtrate from the last stage filtration of Example II was extracted 5 times with small quantities of benzene. The extract was combined and distilled. After the removal of benzene, a residue of tan crystals remained, having an indicated purity by the 46.1° C. freezing point of 94.9% indole. Approximately complete recovery of all of the starting indole in the original sample material was obtained. The $NH_3$ was recovered by heating the recovered $NH_4OH$ solution and absorbing the gas in water, which, with suitable adjustment of concentration and volume, was available for reuse.

EXAMPLE IV

A sample of indole having a purity of 98.4% was washed several times with pentane. The washed sample had a freezing point of 49.4° C. indicating a purity of about 99%. Approximating 13 parts of the washed crystals were treated with 1000 parts of 12.4% NH$_4$OH at 140° F. After the solution was substantially complete, the liquid was recovered by decantation, chilled to 40° F. and allowed to crystallize. The crystals were recovered by filtration and vacuum dried at room temperature. Approximately 63% of material was recovered having a freezing point of 50.7° C. with an indicated purity of 99.7%.

From the foregoing it is evident that a high degree of purity is readily and effectively obtained. This method of recrystallization is suitable for not only indole but also for the homologues of indole and other related heterocyclic organic nitrogen compounds.

EXAMPLE V

A sample of crude skatole (3-methylindole), with the determined freezing point of 85.1° C., was subjected to purification. Approximately 4 parts of the crude sample were treated with about 500 parts of 7.5% aqueous ammonia solution in a closed system at 190° F. with agitation for about one-half hour. The clear solution was drawn off and cooled to 40° F. where crystallization was allowed to come to completion. The pale tan crystals were recovered by filtration and dried at room temperature under vacuum. The recovered product, totalling about 65% of the original material, had an uncorrected freezing point of 98.3° C., as compared to literature values showing 92° to 98° C., showing a high degree of purity. In addition, the purified product had a markedly less offensive odor than that of the so-called "pure" skatole.

Purified indole and its homologues are of particular interest when considered in perfumery and odorants, pharmaceuticals and precursors of materials such as amino acids (tryptophane) and dyestuffs.

Obviously, many modifications and variations of the present invention as hereinbefore set forth may be made without departing from the spirit and scope thereof, and accordingly only such limitations should be applied hereto as are indicated in the appended claims.

What I claim is:

1. The process for the purification of heterocyclic organic nitrogen compounds of the group consisting of indole and skatole comprising dissolving such compound in impure state in 10 to 1000 parts by weight of aqueous ammonia consisting essentially of ammonia and water and containing 2 to 15 weight percent NH$_3$, said dissolving being effected at a temperature in the range of 75 to 190° F., reducing the temperature of the obtained solution to a temperature no greater than 50° F. to crystallize the said heterocyclic nitrogen compound, and separating and recovering crystals of the purified heterocyclic nitrogen compound.

2. The process of purifying heterocyclic organic nitrogen compounds of the group consisting of indole and skatole which comprises treating such a compound at 75 to 190° F. with 10 to 1000 parts by weight aqueous ammonia, said aqueous ammonia consisting essentially of ammonia and water and containing 2 to 15 percent by weight NH$_3$, thereby effecting substantially complete solution of said heterocyclic compound, separating the thus obtained solution from undissolved residue, cooling the separated solution to a temperature in the range of 30–50° F. thereby crystallizing said heterocyclic nitrogen compound therefrom, and separating and recovering crystals of the purified heterocyclic nitrogen compound.

3. The process in accordance with claim 2 in which indole is recovered as the purified heterocyclic organic nitrogen compound.

4. The process in accordance with claim 2 in which skatole is recovered as the purified heterocyclic organic nitrogen compound.

5. The process for the separation and recovery of substantially pure indole from an indole mixture containing associated contaminants from the group consisting of polyindoles, ethyl aniline, tars, and degradation products of indole; which process comprises: washing the said mixture with a liquid paraffinic hydrocarbon having up to 6 carbon atoms to effect removal of oily impurities, dissolving the washed product at 75 to 150° F. in 10 to 1000 parts of aqueous ammonia, said aqueous ammonia consisting essentially of ammonia and water and containing 2 to 15 weight percent NH$_3$, separating and removing undissolved material from the obtained ammoniacal solution, cooling the ammoniacal solution to below 50° F., crystallizing indole in said cooled solution, and separating and recovering crystals of purified indole.

6. The process in accordance with claim 5 in which said cooled solution is maintained at a temperature in the range of 30–50° F.

7. The process in accordance with claim 5 in which said dissolution is effected at a temperature in the range of about 140–150° F.

8. The process for purifying the indole present in a crystallized system containing in the order of 80–90% indole such process comprising, washing said crystallized system with liquid pentane until substantially only pentane is recovered, introducing the washed crystallized tane into contact with 10 to 1000 times its weight of aqueous ammonia consisting essentially of ammonia and water and containing 2–15 weight percent NH$_3$, maintaining such contact at a temperature in the range of 140–150° F. until substantially all of the crystal system is dissolved, separating the obtained solution of indole in ammonia from undissolved residue, chilling said separated solution to a temperature in the order of 30–40° F. and recovering from said chilled solution crystals of substantially pure indole.

9. The process in accordance with claim 8 wherein said chilled solution after removal of said purified indole crystals is utilized as at least part of said aqueous ammonia solution in the further treatment of additional amounts of said washed crystallized system.

10. The process for the separation of indole having a purity of at least 99.5% from an indole mixture containing associated contaminants from the group consisting of polyindoles, ethyl aniline, tars, and degradation products of indole, said process comprising treating such an impure indole at 140–150° F. with 10 to 1000 times its weight of aqueous ammonia, said aqueous ammonia consisting essentially of ammonia and water and containing 2 to 15% by weight NH$_3$, obtaining thereby substantially complete solution of said indole, separating and recovering aqueous ammonia solution of indole from residual undissolved material, effecting crystallization of said indole from said ammoniacal solution at a temperature in the range of 30° to 50° F., and separating and recovering said crystals as purified indole having a purity in excess of 99.5%.

References Cited in the file of this patent

UNITED STATES PATENTS

| | | |
|---|---|---|
| 1,548,920 | Weil | Aug. 11, 1925 |
| 2,242,842 | Weinmayr | May 20, 1941 |
| 2,435,125 | Britton et al. | Jan. 27, 1948 |
| 2,720,526 | Sweeney | Oct. 11, 1955 |
| 2,799,677 | Findlay | July 16, 1957 |

FOREIGN PATENTS

| | | |
|---|---|---|
| 695,479 | Great Britain | Aug. 12, 1953 |